(12) United States Patent
Sumi et al.

(10) Patent No.: US 6,950,550 B1
(45) Date of Patent: Sep. 27, 2005

(54) TRACING TECHNIQUE AND RECORDING MEDIA OF OBJECT MOTION

(75) Inventors: Yasushi Sumi, Tsukuba (JP); Fumiaki Tomita, Tsukuba (JP); Yutaka Ishiyama, Tokyo (JP)

(73) Assignees: Koji Kajimura, Tokyo (JP); Stanley Electric Co., Ltd., Tokyo (JP)

( * ) Notice: Subject to any disclaimer, the term of this patent is extended or adjusted under 35 U.S.C. 154(b) by 428 days.

(21) Appl. No.: 09/669,384

(22) Filed: Sep. 26, 2000

(30) Foreign Application Priority Data

Jul. 7, 2000 (JP) .............................. 2000-206818

(51) Int. Cl.[7] .......................... G06K 9/00; H04N 5/225
(52) U.S. Cl. ....................... 382/154; 382/107; 348/169
(58) Field of Search ............................... 382/154, 107; 348/169; 345/418, 419

(56) References Cited

U.S. PATENT DOCUMENTS

| 5,574,498 | A | * | 11/1996 | Sakamoto et al. | 348/169 |
| 5,616,078 | A | * | 4/1997 | Oh | 463/8 |
| 5,692,061 | A | * | 11/1997 | Sasada et al. | 382/106 |
| 5,845,006 | A | * | 12/1998 | Sumi et al. | 382/154 |
| 6,072,903 | A | * | 6/2000 | Maki et al. | 382/190 |

FOREIGN PATENT DOCUMENTS

| JP | 6-306433 P | 8/1995 |
| JP | 9-277885 P | 5/1998 |
| JP | 3-800031 P | 4/2000 |

OTHER PUBLICATIONS

Saito et al., "3D Shape Measurement of Underwater Objects Using Motion Stereo", IEEE, 1995, 1231-1235.*

* cited by examiner

Primary Examiner—Brian Werner
Assistant Examiner—Shefali Patel
(74) Attorney, Agent, or Firm—Gifford, Krass, Groh, Sprinkle, Anderson & Citkowski, P.C.

(57) ABSTRACT

After stereo image is inputted (S1), the tracing point corresponding to the silhouette of a curved object observed by the stereo image is selected on the basis of the information on the present position of the object (S2), using a three-dimensional geometric model. And the corresponding points on the silhouette corresponding to respective tracing points are sampled from the stereo image (S3), and their three-dimensional coordinates are measured (S4). Then, from the group of the three-dimensional coordinates of tracing points and corresponding points, the position/posture of the object concerned and the measurement error are determined (S5), to discriminate the error (S6). In case the error is not small enough, processes starting from (S2) are repeated, regarding the detected position/posture as a renewed present position, while, if the error is small enough, processes are repeated starting from (S1), regarding the detected position/posture as a renewed present position, thereby providing the technique for high-speed tracing of three-dimensional rigid body motion of an arbitrarily-curved and smooth faced object utilizing an object model, applying a stereo camera system as sensors.

9 Claims, 6 Drawing Sheets

Flow of Basic Processing of This Invention

An Example of Time-Series Stereo Image

An Example of Estimated Initial Position of a Curve-Faced Object

An Example of Net Configuration of a Curve-Faced Object Model

Method of Searching for a Corresponding Edge Point

Method of Searching for a Stereo Corresponding Point

Method of Three-Dimensional Estimation of a Corresponding Point by Monocular Vision Measurement Error of a Curve-Faced Object in Stereo Vision

FIG.10
An Example of a Tracing Result of an Arbitrarily-Curved Object
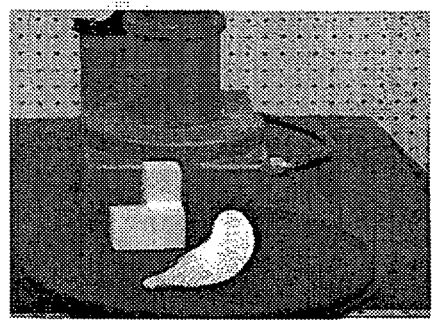
Frame 20
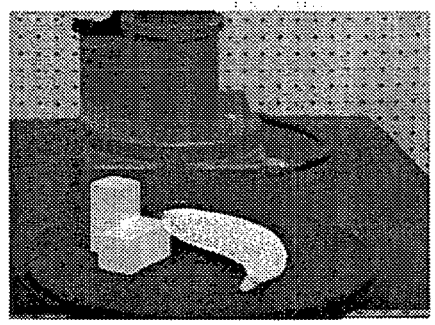
Frame 70
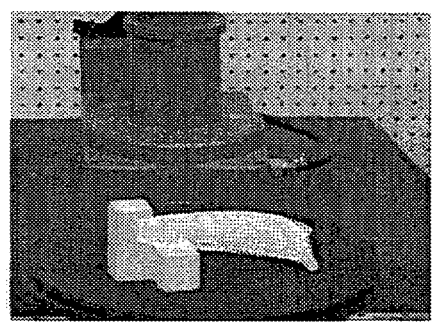
Frame 120
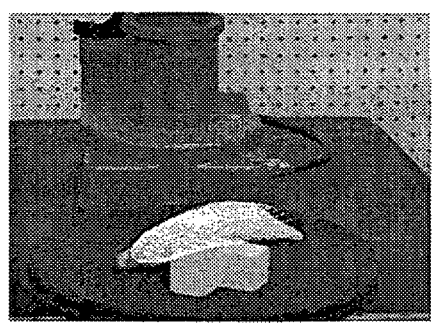
Frame 170

TRACING TECHNIQUE AND RECORDING MEDIA OF OBJECT MOTION

BACKGROUND OF THE INVENTION

1. Field of the Invention

The present invention relates to an object motion tracing technique for tracing the three-dimensional motion of an object obtained in time series on the basis of the stereo image of the object concerned, and also to a recording media wherein an executing program for object motion tracing is recorded.

2. Brief Description of the Prior Art

Generally, for tracing the three-dimensional rigid body movement of a curve-faced object, time-series images consecutively obtained from a visual sensor as an image pick-up means are used. If the form of the traced object is known, the tracing point can be estimated in correspondence search by using a three-dimensional geometric model of the object concerned, thereby realizing highly-accurate tracing of the position and the posture of the curve-faced object, wherein tracing is comparatively unaffected by partial occlusion.

Prior arts known for tracing the three-dimensional rigid body motion of an object using an object model are as follows:

(1) Method of using a monocular CCD camera as a sensor,
(2) Method of applying a stereo camera system consisting of a plural number of CCD cameras as sensors, and
(3) Method of using a range finder as a sensor.

The silhouette of the curve-faced object as mentioned above is an apparent silhouette whose shape consecutively varies according to the position/posture of the object concerned, and it is difficult to estimate and measure its position accurately. Therefore, the objects traced by the above-mentioned prior arts (1) or (2) were limited to those having fixed-edge structures that are invariable according to observing directions, such as polyhedrons, cylinders, etc., but arbitrary-curve-faced objects with smooth faces have never been traced by those prior arts. In the prior art (3) above, objects of free forms including arbitrary-curve-faced objects can be traced by utilizing the three-dimensional information on the surface, but a special type of sensor such as a high-speed laser range finder is needed for that purpose.

SUMMARY OF THE INVENTION

The present invention was carried out in consideration of the aforesaid problems, and aims at providing an object motion tracing technique whereby the three-dimensional movement of a curve-faced object is traced accurately at a high speed, utilizing an object model and applying as sensors a stereo camera system consisting of a group of image pick-up cameras.

The object motion tracing technique related to the present invention is a method of tracing the three-dimensional motion of an object, based on the stereo image of the object concerned obtained in time series, composed of a selection step for selecting a tracing point corresponding to the silhouette of the object concerned on the stereo image of aforesaid object, a sampling step for sampling from the stereo image corresponding points on the silhouette of the object corresponding to respective tracing points; a measuring step for measuring the three-dimensional coordinates of the sampled corresponding points, and a detecting step for detecting the position/posture of the object concerned from each of the three-dimensional coordinates of the tracing points and the corresponding points, wherein the three-dimensional motion of the object can be traced by continuously repeating each process on above-mentioned steps from the selecting step through the detecting toward each frame of the stereo image obtained in time series.

A recording media related to the present invention is a media wherein an object motion tracing program is recorded for tracing the three-dimensional movement of an object based on the stereo image of the object obtained in time series, composed of a selecting step for selecting tracing points corresponding to the silhouette of the object concerned on the stereo image of the object, a sampling step for sampling from the stereo image the corresponding points on the silhouette of the object corresponding to each tracing point; a measuring step for measuring the three-dimensional coordinates of the sampled corresponding points, and a detecting step for detecting the position/posture of the object from each of the three-dimensional coordinates of the tracing points and the corresponding points, wherein a program is recorded for executing the tracing of the three-dimensional motion of the object by continuously repeating each process on those steps from the selecting step through the detecting one toward each frame of the stereo images obtained in time-series.

BRIEF DESCRIPTION OF THE DRAWINGS

FIG. 10 is an example of a tracing result of an arbitrarily-curved object.

DETAILED DESCRIPTION OF THE PREFERRED EMBODIMENT

Hereinafter the object motion tracing technique of the present invention is described in detail based on the embodiment.

Figure 1:
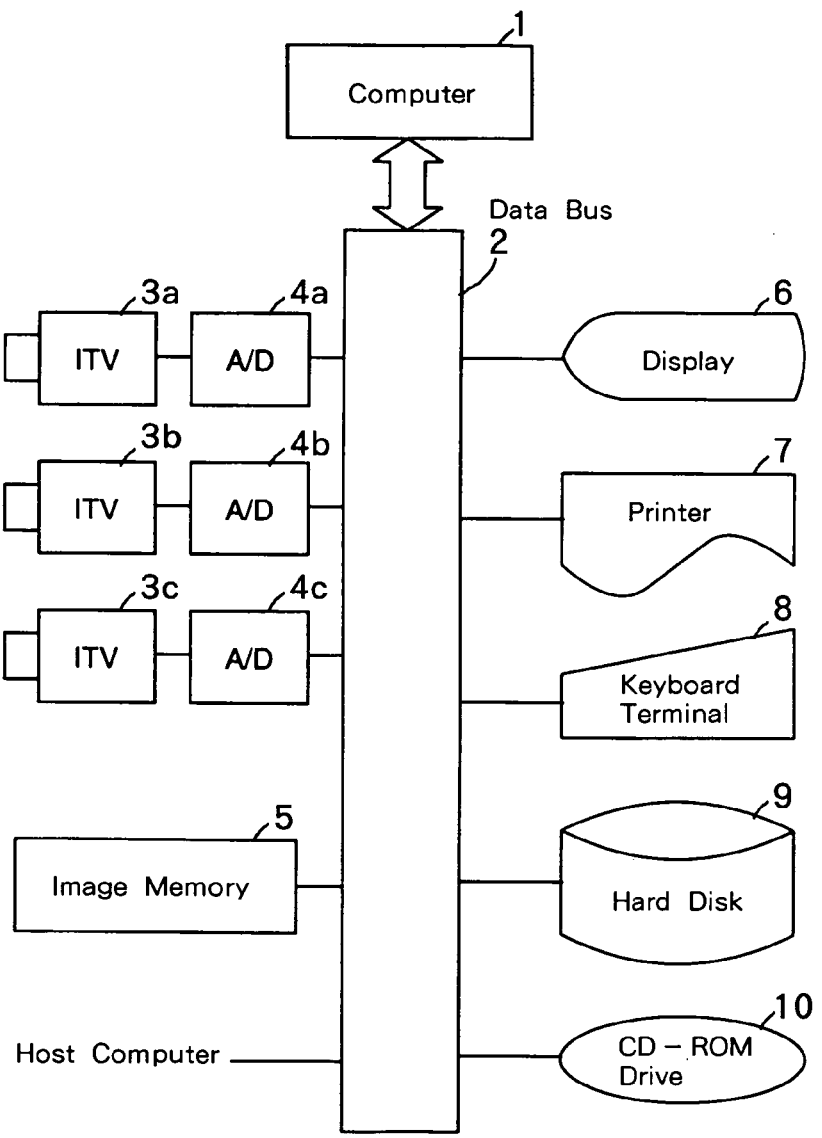
FIG. 1 is a block diagram showing a system configuration for embodying the present invention.

FIG. 1 is a block diagram showing the system configuration for executing the method of generating a three-dimensional object model by the present invention. In this Figure, a numerical sign 1 is a computer to control the entire system, and is connected with each of the under-mentioned parts through data bus 2.

Signs 3a, 3b and 3c stand for television cameras, whose analog output data are transmitted to data bus 2 after being converted to digital signals by A/D Converters 4a, 4b and 4c.

A numerical sign 5 stands for the image memory for storing image data on the object picked up by television cameras 3a, 3b and 3c, while 6 stands for the display unit for displaying the image, numeral 7 shows a printer and 8 a keyboard terminal.

Numeral 9 shows a hard disk unit for storing the system software for the object motion tracing program related to the present invention and storing the three-dimensional geometric model of the object concerned, as well as for consecutively recording the three-dimensional information restored by stereo vision and the information on the object motion parameter obtained by the motion tracing process.

Numeral 10 stands for the CD-ROM Drive for reading CD-ROMs wherein the object motion tracing program is recorded, and the above-mentioned system software is installed onto the Hard Disk 9 from this CD-ROM.

The aforementioned system is connected to an external host computer, etc. via data bus 2.

Figure 2:
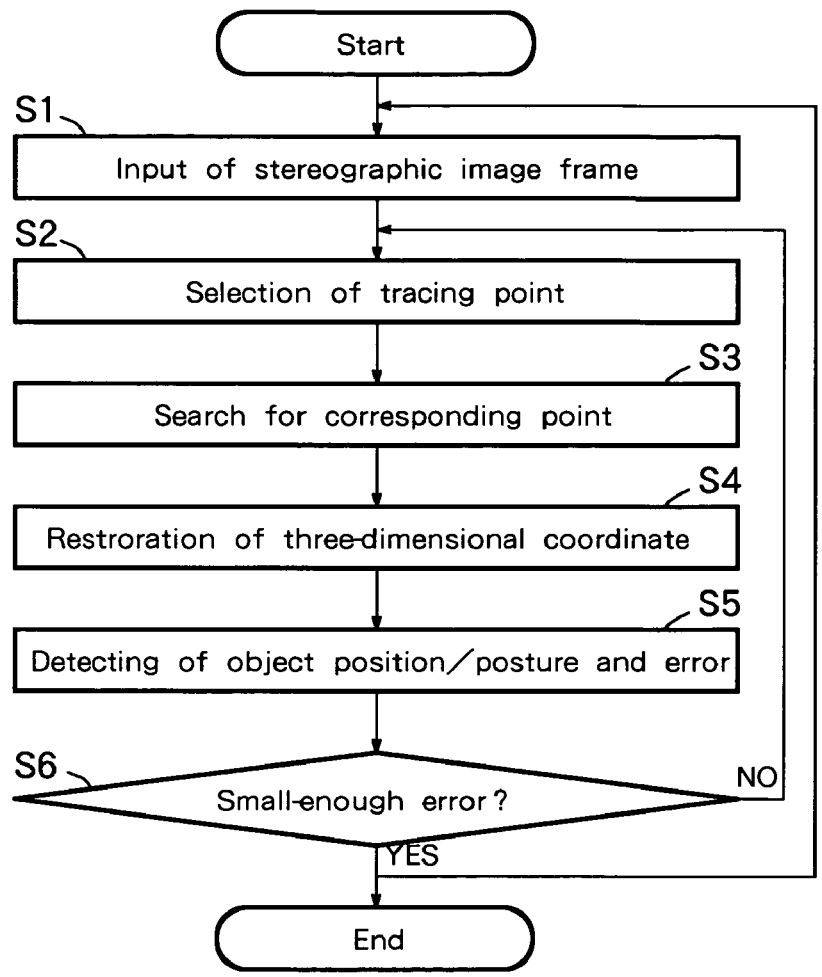
FIG. 2 is a flow chart showing the flow of basic processing of the present invention.

FIG. 2 is a flow chart of the basic processing operation in the system of aforesaid configuration, showing the processing flow for tracing the three-dimensional rigid body motion of a curve-faced object on the basis of the stereo image of the object concerned obtained in time-series.

This processing operation is carried out by a program pre-memorized by the Computer 1 in FIG. 1, consisting of:
the input step (S1) where the stereo image of an arbitrary-curve-faced object performing a three-dimensional rigid body motion is inputted as a frame signal from an image pick-up camera applying CCD, etc.;
the selecting step (S2) where the tracing points corresponding to the silhouette of an object on the stereo image of the object concerned is selected;
the sampling (searching) step (S3) where the corresponding point on the silhouette of the object corresponding to each tracing point is sampled from above-mentioned stereo image;
the measuring step (S4) where the three-dimensional coordinates of the sampled corresponding points are measured (restored);
the detecting step (S5) where the position/posture of the above-mentioned object is detected from each of the three-dimensional coordinates of the tracing points and the corresponding points; and
the discriminating step (S6) where it is discriminated whether the error of measured position/posture of the object concerned is small enough or not, wherein;
the three-dimensional motion of the object is traced by continuously repeating the processing (S2~S5) on each of those steps from the selecting step (S2) through the detecting one (S5) toward each frame of the stereo image obtained in aforementioned time series.

Firstly, a stereo image is inputted (S1), and the tracing points corresponding to the silhouette of a curve-faced object observed on the stereo image are selected based on information on the present position of the object concerned, using a three-dimensional geometric model (S2). Then, the corresponding points on the silhouette of the object corresponding to respective tracing points are sampled from aforesaid stereo image (S3), so that their three-dimensional coordinates are measured. (S4).

Then, based on the group of the three-dimensional coordinates of respective tracing points and respective measured corresponding points, the position/posture of the object concerned and the error are determined (S5), and it is discriminated whether the error is small enough or not (S6). In case the error is not small enough, then the processes from (S2) above are repeated, regarding the detected position/posture as the renewed present position of the object concerned. If the errors are small enough, the same processes from (S1) above are repeated, regarding the detected position/posture of the object concerned as the renewed present position.

Hereunder the above processes are described in detail, referring to FIG. 3 through FIG. 10.

Figure 3:
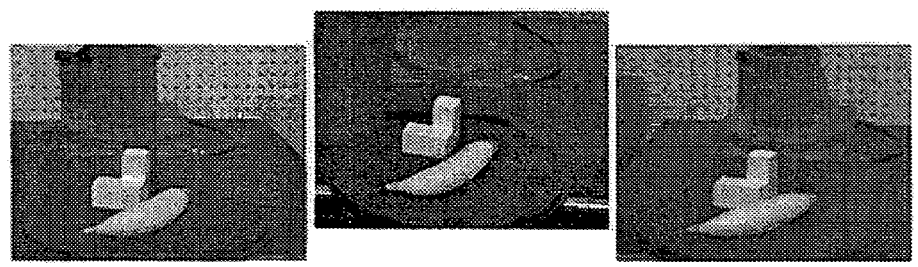
FIG. 3 is an initial picture of time-series stereo image.

FIG. 3 shows an example of the initial frame (frame 0) of an inputted time-series stereo image. For tracing the motion of an object using a geometric model of the object concerned, it is essential to accurately determine, as the initial tracing position, the three-dimensional position/posture of the object concerned in the initial frame. The description of the method of estimating the initial position of an object is omitted, as it is not necessary here.

Figure 4:
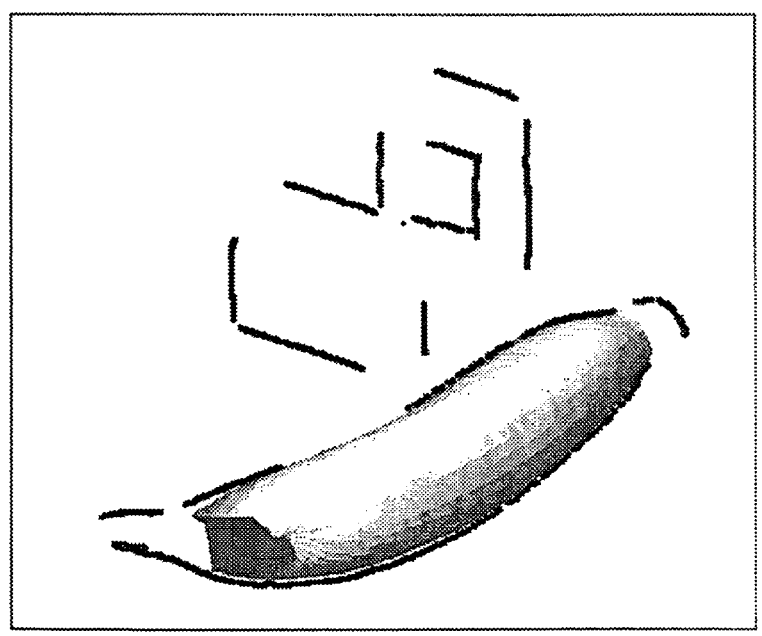
FIG. 4 is an example of the initial frame of a curve-faced object.

FIG. 4 is a drawing showing an example of estimated initial position of an arbitrary-curve-faced object (a toy banana here), together with the three-dimensional silhouette in a scene restored by the segment-based stereo method.

Following is the description of how the tracing points corresponding to the silhouette of a curved object are selected from the object model.

Figure 5:
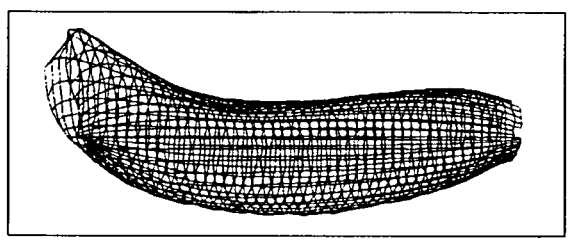
FIG. 5 is an example of the net configuration of a curve-faced object model.

FIG. 5 is an example of net configuration of an object model. Here, an arbitrarily-curved object is modeled as a net configuration with nodes of a limited number of representative points (model points) having a spatially neighboring mutual relationship (four couplings).

The silhouette of an arbitrarily-curved object is an apparent silhouette which consecutively transforms according to observing directions. For tracing the motion of an arbitrarily-curved object, the rigid body motion parameters of an object between frames of inputted images in time series and the form of the silhouette varying every moment need to be estimated at the same time.

For that purpose, the form of the hidden silhouette is roughly estimated at a high speed on the basis of the assumed position/posture of an object in a frame, using an object model and the known observing position. It can be discriminated by the following formula whether a point on the object surface corresponding to the model point P is observable or not from the observing position O at the assumed position of the targeted object (see FIG. 9).

Formula (1)

$$vis\ (P) = \begin{cases} 1 & \text{if } (P-O) \cdot N \leq 0 \\ 0 & \text{otherwise} \end{cases} \quad (1)$$

In this formula, N is a normal vector at a point P. Therefore, the hidden silhouette of a curved surface observed on the image can be regarded as the boundary of an area consisting of observable model points, or, it can be regarded to be equal to P in the following formula.

(Formula 2)

$$\begin{cases} vis\ (P) = 1, \\ \sum_{i=1}^{4} vis\ (P_{next\ (i)}) \neq 4 \end{cases} \quad (2)$$

In this formula, $P_{next(i)}$ represents a model point adjacent to P. A group of such model points $\{P_i\}$ can be fetched by the following processes (a) and (b) towards the net configuration of the model.

(a) The nodes satisfying the formula (1) are labeled.
(b) The nodes satisfying the formula (2) are searched out, and starting from the searched node, other nodes satisfying the formula (2) are traced.

These processes can be carried out at a high speed by a simple raster scan. Hidden portions are not checked here, as it is costly to do so.

Motion between frames is estimated by searching for the corresponding points on a following frame image, regarding a number of model points obtained by above-mentioned processing as tracing points. Though three-dimensional movement can be estimated in principle if there are three points that are not on a same straight line, as many tracing points as processing time allows are used here in order to obtain strength against occlusion.

Hereunder the searching procedure for corresponding points is described. Object motion tracing is the repetition of the process for determining the corresponding points in the frame (F r a m e (t+1)) at a following time t+1 corresponding to the tracing point P at a time t, and can be carried out by processes (c) and (d) below.

(c) Search for a Corresponding Edge Point

From the position PL where P is projected into the initial image Frame$_L$, pixel is vertically traced to search for the maximal point D$_L$ of the differentiated value of pixel.

(d) Search for a Stereo Corresponding Point

Figure 6:
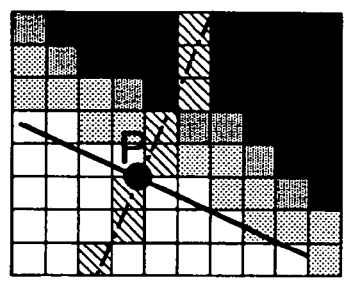
FIG. 6 is a method of searching for a corresponding edge point.
Figure 7:
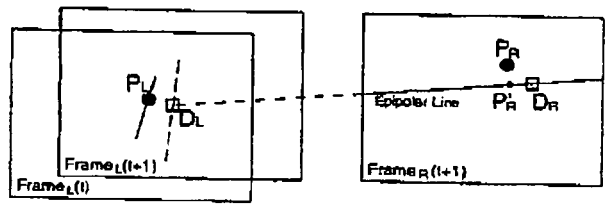
FIG. 7 is a method of searching for a stereo corresponding point.

The epipolar line on image Frame$_R$ corresponding to DL is determined, and as shown in FIG. 7, D$_R$ is searched for in the epipolar line direction as in FIG. 6, from the point P'$_R$ which is the nearest point to the tracing point P$_R$ on the epipolar line.

These processes are basically differentiation processes for the simple one-dimensional data obtained by tracing, and the calculation cost is small.

Hereunder the restoration of the three-dimensional coordinates of corresponding points by the stereo method is described. The coordinate values of $\{D_L, D_R\}$ searched for by above-mentioned processes are converted to sub pixel based on the inclination of neighboring pixel values, to determine the three-dimensional coordinate D on the basis of the principle of trigonometrical survey.

Generally, when the edge direction of a tracing point is parallel or almost parallel to the epipolar line, binocular stereo measurement causes a bigger error. The easiest way to solve this is to apply a trinocular stereo system with an extra camera Frame$_v$ above or below the baseline of the right and the left stereo cameras. For each of the tracing points, out of the trinocular combinations $\{L, R\}$, $\{L, V\}$ and $\{R, V\}$, a combination with a larger angle formed by the edge direction and the epipolar line is selected to execute the searching process as above-mentioned. Then, for the obtained corresponding point $\{D_1\}$, miscorresponding is eliminated by checking the distance |P$_i$–D$_i$| from the model point.

Figure 8:
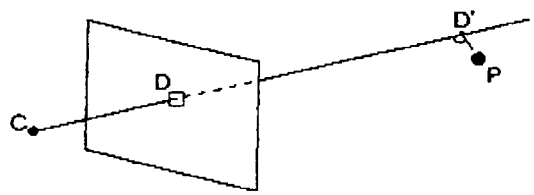
FIG. 8 is a method of three-dimensional estimation of a corresponding point by monocular vision.

Following is the description of restoration of the three-dimensional coordinates of corresponding point by monocular vision. Search for corresponding points does not always proceed successfully due to occlusion and/or noise. If a corresponding point can be found only monocularly, or only by a binocular combination which is almost parallel to epipolar line, miscorresponding data are eliminated as follows: As shown in FIG. 8, when the end of the vertical line starting from P to the projected line connecting the centers of the camera lenses C and D is regarded as D', miscorresponding data are eliminated for the obtained corresponding point $\{D_i\}$ by checking the distance |P$_i$–D$_i$| from a model point.

Then, description is made on the method of determining the position/posture and error of the object concerned on the basis of the group of the three-dimensional coordinates of respective measured corresponding points and tracing points. The motion parameter of an object from Frame (t) to Frame (t+1) can be expressed by 3×3 rotation matrix R and translation vector T, and can be calculated by the least square method in the following formula which minimizes the error in moving $\{P_i\}$ to $\{D_i\}$.

$$\min_{R,T} \sum_{i=1}^{n} |RP_i + T - D_i|^2 \qquad (3)$$

Figure 9:
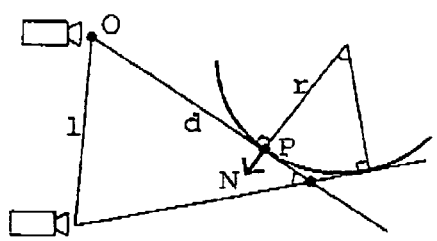
FIG. 9 is a measurement error of a curve-faced object in stereo vision.

Here, the position/posture of the model is renewed according to calculated R and T. If the error is not small enough, the processes starting from estimation of the hidden silhouette are repeated to make the error convergent by so-called "hill-climbing method". As well known, in measuring the hidden silhouette of a curved surface by stereo vision, the error as shown in FIG. 9 is included. When the baseline length of cameras is 1, the distance to the object is d and the curvature of the curving surface concerned is 1/r, the size of the error e between the hidden silhouette estimated from the model and the value measured by stereo vision may be regarded as e≈r ½ d, in case of 1<<d and r<<d. As e is regarded to be small enough in many cases, it is not taken into account here.

FIG. 10 shows an example of the result of motion tracing experiment using a rotary table for an arbitrarily-curved object model shown in FIG. 3 (Diameter: about 3 cm, Space between nodes: about 3 mm). The model is moved according to R and T determined in each frame, so that the model nodes are projected onto the inputted image. The experiment proves that tracing is possible under a partial-occlusion environment.

Thus, this embodiment can realize high-speed and accurate three-dimensional rigid body motion tracing of a curved object utilizing an object model, by applying a stereo camera system consisting of a group of CCD cameras as sensors.

Further, the program for executing the above-mentioned three-dimensional rigid body motion tracing of a curved object can be recorded in an optional recording media, in the form readable by a computer.

As described above, according to the present invention, the three-dimensional motion of a curve-faced object can be traced at a high speed and with accuracy, utilizing an object model, by applying as sensors a stereo camera system consisting of a group of image pick-up cameras.

What is claimed is:

1. An object motion tracing method for tracing the three-dimensional motion of an object having an arbitrarily curved and smooth surface, based on the stereo image of the object concerned obtained in time series, composed of:

an inputting step for inputting a stereographic image frame of the object concerned;

a selecting step for selecting tracing points on a three-dimensional object model corresponding to the silhouette of the object concerned in the inputted image frame based on the present position of the object concerned;

a sampling step for sampling points on the silhouette of the object in the image frame corresponding to respective tracing points on the three-dimensional object model;

a measuring step for measuring the three-dimensional coordinates of the sampled corresponding points; and a detecting step for detecting the position/posture of the object from the three-dimensional coordinates of those respective tracing points and respective corresponding points and for detecting a detection error, wherein if the detected error is not small enough, the three-dimensional motion of aforesaid object is traced by continuously repeating each process from the selecting step through the detecting step toward each frame of the stereo image obtained in time series, or if the detected error is small enough, the three-dimensional motion of the aforesaid object is traced by continuously repeating each process from the inputting step through the detecting step toward each frame of the stereo image obtained in time series.

2. The object motion tracing method according to claim 1, wherein the three-dimensional geometric model of an object is used to select the tracing points on the selecting step.

3. The object motion tracing method according to claim 1, wherein the three-dimensional coordinates are measured by stereo vision applying stereo correspondence on the measuring step.

4. The object motion tracing method according to claim 1, wherein the three-dimensional coordinates are measured by monocular vision on the measuring step.

5. A computer readable medium wherein an object motion tracing program is recorded for tracing the three-dimensional motion of an object having an arbitrarily curved and smooth surface on the basis of the stereo image of the object obtained in time series, composed of:

an inputting step for inputting a stereographic image frame of the object concerned;

a selecting step for selecting the tracing point corresponding to the silhouette of the object concerned on the inputted image frame based on the present position of the object concerned;

a sampling step for sampling points on the silhouette of the object in the image frame corresponding to respective tracing points on the three-dimensional object model;

a measuring step for measuring the three-dimensional coordinates for the sampled corresponding points; and a detecting step for detecting the position/posture of the object from respective the three-dimensional coordinates of the respective tracing points and respective sampled points and for detecting a detection error, wherein if the detected error is not small enough, the program for executing the tracing of the three-dimensional motion of the object continuously repeats each process from the selecting step through the detecting step as mentioned above toward each frame of the stereo image obtained in time series, or if the detected error is small enough, the program for executing the tracing of the three-dimensional motion of the object continuously repeats each process from the inputting step through the detecting step toward each frame of the stereo image obtained in time series.

6. The computer readable medium according to claim 5, wherein the program is recorded for executing the selection of the tracing point using the three-dimensional geometric model of an object on the selecting step.

7. The computer readable medium as according to claim 5, wherein
the program is recorded for executing the measurement of the three-dimensional coordinates by stereo vision applying stereo correspondence on the measuring step.

8. The computer readable medium according to claim 5, wherein the program is recorded for executing the measurement of the three-dimensional coordinates by monocular vision on the measuring step.

9. An object motion tracing method for tracing the three-dimensional motion of an object having an arbitrarily curved and smooth surface, based on the stereo image of the object concerned obtained in time series, composed of:

a selecting step for selecting tracing points corresponding to the silhouette of the object concerned in the stereo image of the object, wherein the rigid body motion parameters of an object between frames of inputted images in time series and the form of the silhouette varying every moment are estimated simultaneously;

a sampling step for sampling from the above-mentioned stereo image the corresponding points on the silhouette of the object corresponding to respective tracing points;

a measuring step for measuring the three-dimensional coordinates of the sampled corresponding points; and a detecting step for detecting the position/posture of the object from the three-dimensional coordinates of those respective tracing points and respective corresponding points, wherein the three-dimensional motion of aforesaid object is traced by continuously repeating each process from the selecting step through the detecting one toward each frame of the stereo image obtained in time series.

* * * * *